US011002166B2

(12) United States Patent
Ravi et al.

(10) Patent No.: US 11,002,166 B2
(45) Date of Patent: May 11, 2021

(54) METHODS AND SYSTEMS FOR AN ACTIVE EXHAUST VALVE (71) Applicant: Ford Global Technologies, LLC, Dearborn, MI (US)

(72) Inventors: Vinod Kumar Ravi, Canton, MI (US); Sumanth Reddy Dadam, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/416,071

(22) Filed: May 17, 2019

(65) Prior Publication Data

US 2020/0362735 A1 Nov. 19, 2020

(51) Int. Cl.
F01N 1/16 (2006.01)
F01N 9/00 (2006.01)
G07C 5/08 (2006.01)

(52) U.S. Cl.
CPC ............ F01N 1/165 (2013.01); F01N 9/00 (2013.01); *F01N 2900/0416* (2013.01); *F01N 2900/0422* (2013.01); *F01N 2900/10* (2013.01); *G07C 5/0816* (2013.01)

(58) Field of Classification Search
CPC ... F01N 1/165; F01N 9/00; F01N 9/02; F01N 2900/0416; F01N 2900/0422; F01N 2900/10; G07C 5/0816; F02D 9/04; F02D 9/06
USPC ............ 60/273, 324, 320–323; 123/320–323
See application file for complete search history.

(56) References Cited

U.S. PATENT DOCUMENTS

| 3,247,666 | A | * | 4/1966 | Behrens | F01N 3/20 60/292 |
| 3,406,515 | A | * | 10/1968 | Behrens | F01N 3/34 60/292 |
| 3,495,950 | A | * | 2/1970 | Frost | F01N 3/34 60/299 |
| 3,884,037 | A | * | 5/1975 | Barber | F01N 3/20 60/292 |
| 4,707,987 | A | * | 11/1987 | Atkin | F02D 9/06 60/324 |
| 6,381,952 | B1 | * | 5/2002 | Asanuma | F02D 9/04 60/324 |
| 6,615,779 | B2 | | 9/2003 | Mae et al. | |
| 6,711,892 | B2 | * | 3/2004 | Tamura | F02D 41/029 60/292 |
| 6,804,601 | B2 | * | 10/2004 | Wang | F02D 41/222 60/602 |

(Continued)

FOREIGN PATENT DOCUMENTS

JP 07097913 A * 4/1995
JP 2017053317 A * 3/2017 ............... F02D 9/04

*Primary Examiner* — Thai Ba Trieu
(74) *Attorney, Agent, or Firm* — Geoffrey Brumbaugh; McCoy Russell LLP (57) ABSTRACT Methods and systems are provided for opportunistically mitigating an intermittent degradation of an active exhaust valve. In one example, a method may include differentiating between a permanent degradation of the active exhaust valve and an intermittent degradation of the active exhaust valve and adjusting actuation of the valve based on a vehicle operating condition and a road condition to mitigate the intermittent degradation.

18 Claims, 6 Drawing Sheets

(56) References Cited

U.S. PATENT DOCUMENTS

| | | | |
|---|---|---|---|
| 6,968,677 B2* | 11/2005 | Tamura | F01N 3/20 60/324 |
| 7,210,289 B2* | 5/2007 | Sugano | F02D 9/04 60/324 |
| 7,406,823 B2* | 8/2008 | Takahashi | F02D 9/04 60/324 |
| 8,336,291 B2* | 12/2012 | Hanari | F02D 9/04 60/292 |
| 8,534,047 B2* | 9/2013 | Keefover | F02D 41/0065 60/278 |
| 8,938,079 B2 | 1/2015 | Valeri et al. | |
| 9,239,016 B2* | 1/2016 | Leone | F02D 9/04 |
| 9,546,592 B2* | 1/2017 | Lingens | F02D 9/06 |
| 9,624,855 B2* | 4/2017 | Leone | F02D 9/04 |
| 2007/0199311 A1* | 8/2007 | Kalish | F01N 3/2066 60/295 |
| 2008/0034737 A1* | 2/2008 | Otsubo | F02D 9/04 60/292 |
| 2014/0158099 A1* | 6/2014 | Asmis | F02M 26/15 123/568.15 |
| 2018/0051607 A1* | 2/2018 | Geer | F01N 1/08 |
| 2018/0128145 A1 | 5/2018 | Uhrich et al. | |
| 2018/0274471 A1* | 9/2018 | Dudar | F02D 41/009 |
| 2019/0017427 A1* | 1/2019 | Dudar | F01N 11/002 |
| 2019/0120101 A1* | 4/2019 | Dadam | F01N 1/166 |

\* cited by examiner

METHODS AND SYSTEMS FOR AN ACTIVE EXHAUST VALVE

FIELD

The present description relates generally to methods and systems for detection and mitigation of a degradation of an active exhaust valve.

BACKGROUND/SUMMARY

An engine system for a vehicle may include an exhaust system with one or more exhaust ducts that are adapted to expel combusted exhaust gases to atmosphere (e.g., via one or more vehicle tailpipes). An active exhaust valve may be placed within each exhaust duct in order to control exhaust noise. For example, these valves may close in order to restrict air flow through the exhaust duct in which they are coupled, thereby controlling exhaust noise to a desirable level. A desirable level of exhaust noise may be attained by adjusting a position of the active exhaust valve. In some examples, these valves may be positioned in the exhaust ducts, after a muffler. During vehicle operation, contaminants such as pebbles, gravel, and other particles may enter the exhaust passage via the tailpipe and get stuck in the valve body of an active exhaust valve. If a contaminant is lodged in the valve body, movement of the valve may be restricted and the valve position may not be changed to a desired position corresponding to a desired engine exhaust sound.

One example approach for diagnosing a degradation of an active valve is shown by Uhrich et al. in U.S. 2018/0128145. Therein, an exhaust diverter valve positioned upstream of a muffler used to regulate exhaust noise, as well as reduce emissions and expedite heating, is diagnosed based on changes in temperature upstream of the valve, during a cold start, when the valve is closed. The temperature upstream of the valve during this specific condition is compared to a temperature upstream of the valve at engine start to diagnose degradation of the exhaust diverter valve.

However, the inventors herein have recognized potential issues with such systems. Upon diagnosis of degradation of an active exhaust valve if a mitigating step is not undertaken, the engine sound control system may become inactive until the engine is serviced. Inability to adjust engine sound based on operator preferences may reduce operator satisfaction. Also, if the valve is stuck in an open position, the operator may not be able to reduce engine (exhaust) sound which may be undesirable when the vehicle travels through areas such as schools, hospitals, where a louder noise is not expected. Also, prolonged engine operation without mitigating action may result in further deterioration of the valve.

In one example, the issues described above may be addressed by a method, comprising in response to detection of an active exhaust valve being intermittently degraded, adjusting actuation of the valve based on a vehicle operating condition and a road condition In this way, by opportunistically or periodically operating the active exhaust valve in a healing mode, a contaminant stuck in an active exhaust valve may be dislodged and the engine sound may be continued to be adjusted based on operator preference for the remaining portion of the drive cycle.

As one example, a first active exhaust valve may be positioned in a first exhaust pipe of a first engine bank and a second active exhaust valve may be positioned in a second exhaust pipe of a second engine bank in a dual bank exhaust system. The engine sound control system may adjust the opening of each of the first active exhaust valve and the second active exhaust valve to a same position to achieve a desired level of exhaust noise. If during actuation of an active exhaust valve, based on feedback from a valve position sensor, it is observed that the valve position is not changing to the commanded position and the valve is stuck at an intermediate position, it may be inferred that the active exhaust valve is degraded, the engine sound control system may be deactivated, and a degradation recovery algorithm may be initiated. The valve may be operated in a healing mode for a first time to dislodge any contaminant stuck in the valve. A healing mode may include duty cycling the valve from a 10% opening to an 80% opening a plurality of times. If the degradation of the valve continues after the first operation in the healing mode, a timer may be set and the degradation of the valve is monitored periodically and a slope based analysis is carried out to determine if the degradation is permanent or intermittent in nature. If the degradation is determined to be intermittent, route and road information may be obtained from a navigation system and/or an external server. Segments in the drive cycle with increased possibility of vibration such as rough road conditions, acceleration/deceleration conditions, and high speed operation of the vehicle may be identified and valve may be operated in a healing mode for a second time to dislodge the stuck particle. The valve may also be operated in a healing mode after a threshold time period or distance traveled. If the degradation is cleared after the second operation in the healing mode, the engine sound control system is reactivated. If the degradation continues after the second operation in the healing mode, the degradation may be indicated as a permanent degradation and the operator may be notified.

In this way, by opportunistically or periodically operating the active exhaust valve in a healing mode, any contaminant stuck in the valve may be dislodged during a drive cycle without external interference. By mitigating the degradation during the drive cycle, it is possible to resume operation of the engine sound control system within the drive cycle, thereby improving operator experience. The technical effect of scheduling an operation of the active exhaust valve in the healing mode during specific driving conditions is that a higher engine vibration and air flow through exhaust passage may facilitate in forcing the stuck particle out of the valve. By differentiating between a permanent degradation and an intermittent degradation via a sloped based approach, it is possible to run a degradation recovery algorithm and resolve the intermittent degradation without disabling the engine sound control system for the entire drive cycle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
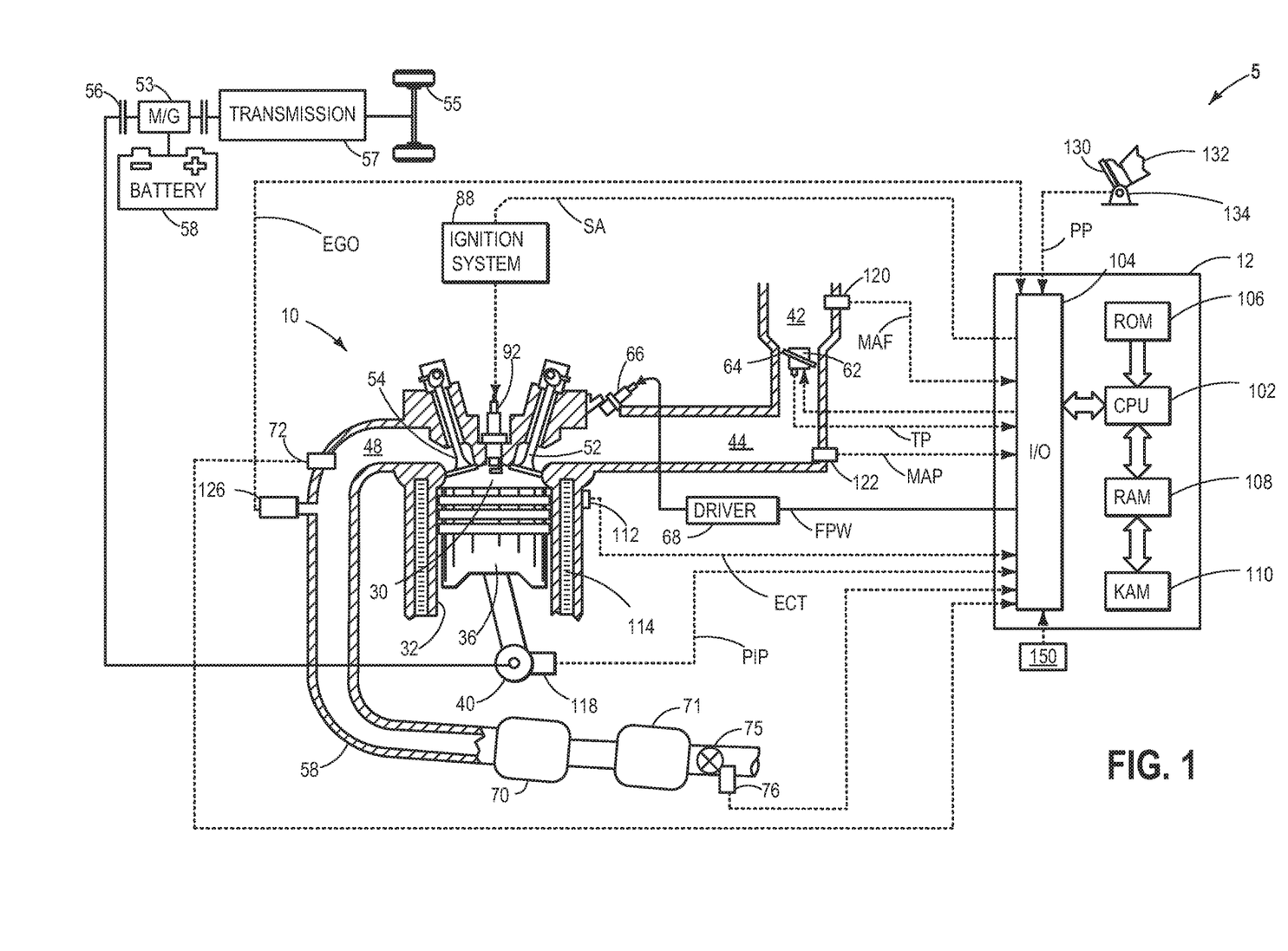
FIG. 1 schematically shows an engine with an exhaust system.
Figure 5:
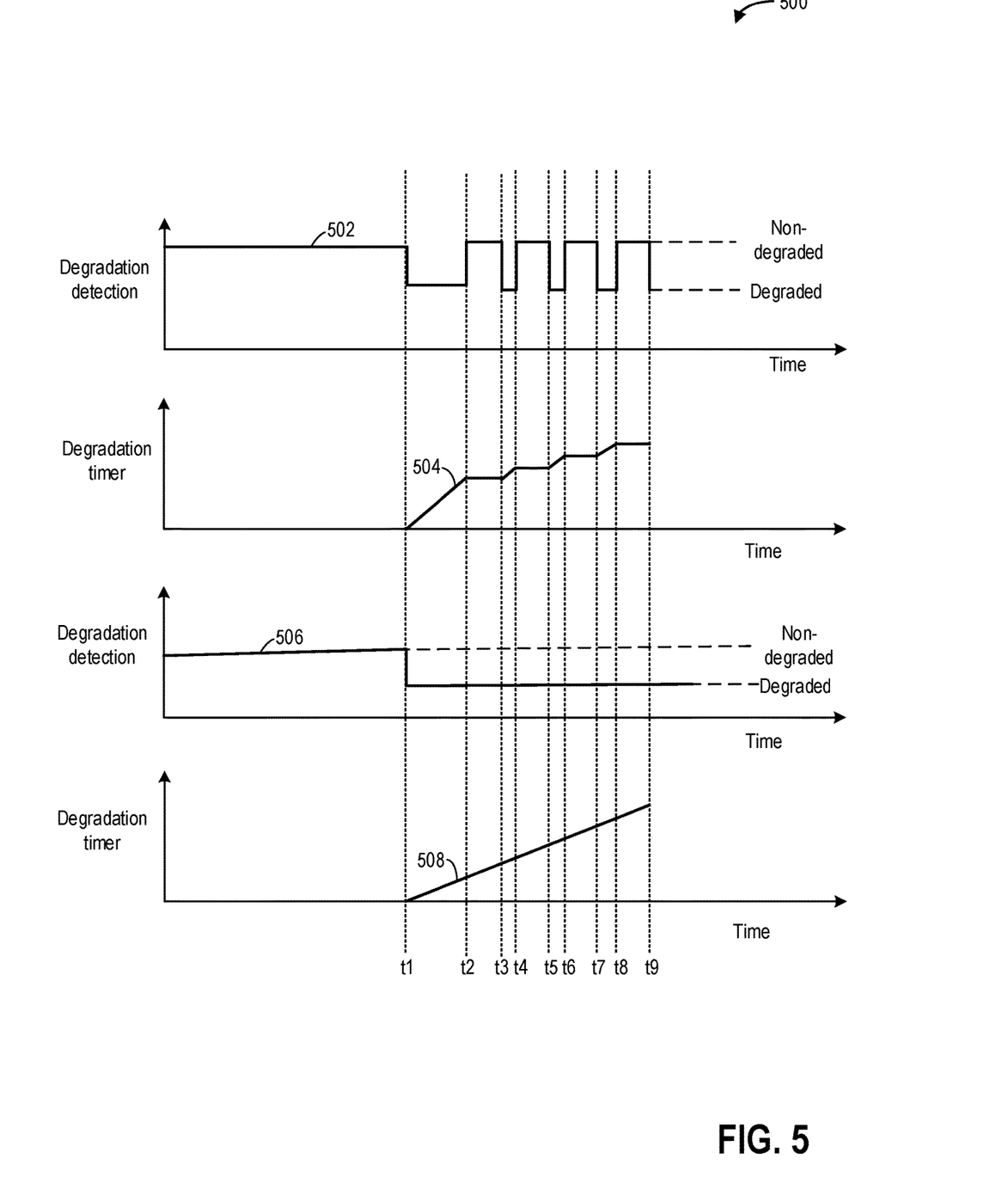
FIG. 5 shows an example differentiation between a permanent degradation and an intermittent fault.
Figure 6:
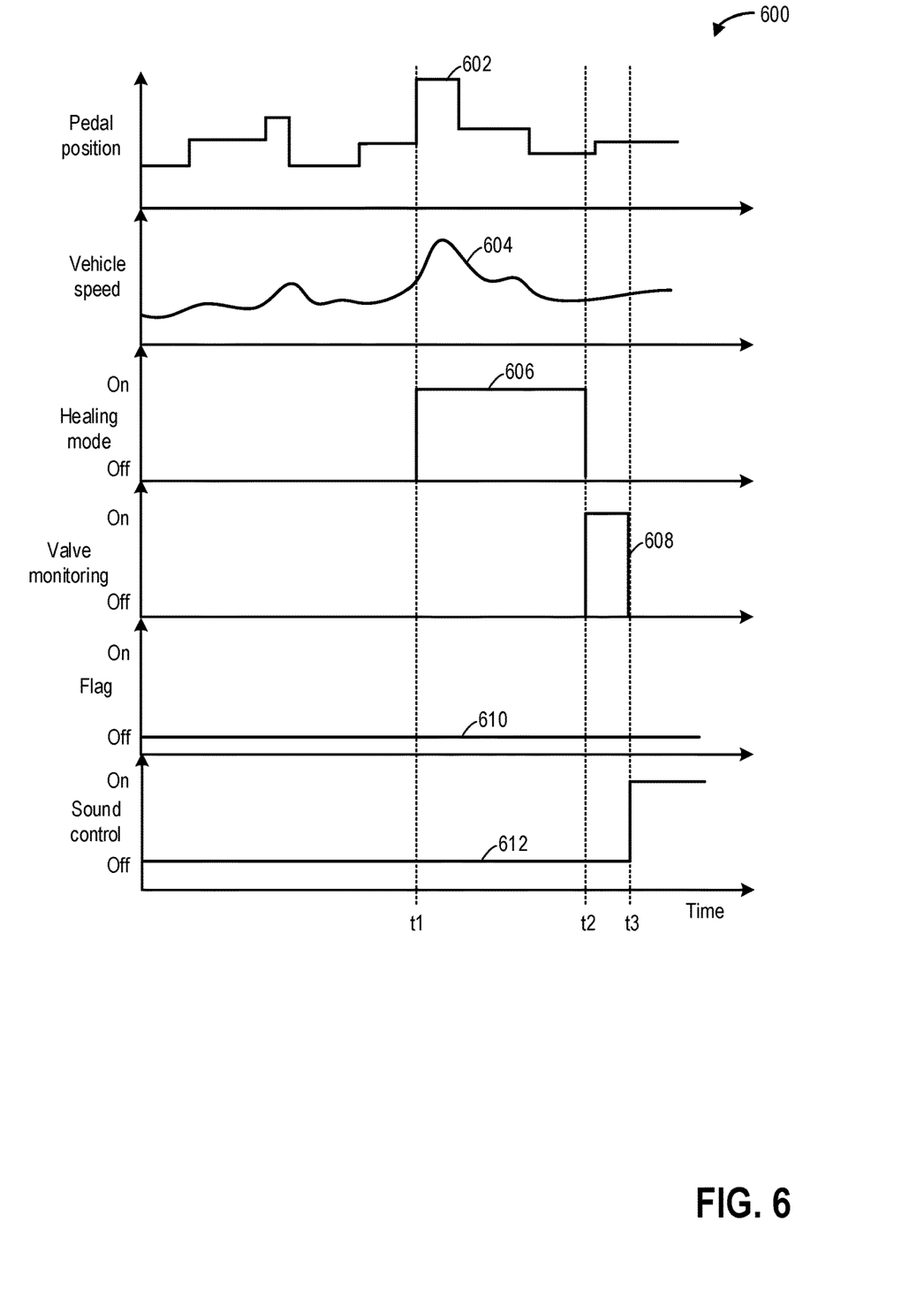
FIG. 6 shows an example mitigation of an intermittent fault.

The following description relates to systems and methods for detection and mitigation of degradation of an active exhaust valve. An active exhaust valve may be positioned in an exhaust pipe (e.g., passage) downstream of a muffler, as shown in the vehicle system of FIG. 1. In some embodiments, the vehicle may include a single bank exhaust system with one active exhaust valve in an exhaust passage of the one bank (as shown in FIG. 1, for example). In other embodiments, the vehicle may include a dual bank exhaust system with two separate exhaust pipes, each including a different active exhaust valve, such as the dual bank exhaust system shown in FIG. 2. An engine controller may be configured to perform control routines, such as the example routines of FIGS. 3 and 4, to detect a degradation of an active exhaust valve, differentiate between a permanent degradation and an intermittent degradation, and mitigate an intermittent degradation. An example differentiation between a permanent degradation and an intermittent degradation is shown in FIG. 5 and an example mitigation of the intermittent degradation is shown in FIG. 6.

Turning to FIG. 1, a schematic diagram of one cylinder of multi-cylinder engine 10, which may be included in a propulsion system of a vehicle 5, is shown. Vehicle 5 may be configured for on-road propulsion. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also termed, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Exhaust manifold 48 may include a temperature sensor 72. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC) (not shown). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 coupled upstream of throttle 62 for measuring the flow rate of aircharge entering into the cylinder through throttle 62. Intake passage 42 may also include a manifold air pressure sensor 122 coupled downstream of throttle 62 for measuring manifold air pressure MAP.

In some embodiments, a compression device, such as a turbocharger or supercharger, including at least a compressor (not shown), may be arranged along intake manifold 44. For a turbocharger, the compressor may be at least partially driven by a turbine (not shown), for example via a shaft, the turbine arranged along exhaust manifold 48. For a supercharger, the compressor may be at least partially driven by the engine and/or an electric machine, and may not include a turbine.

Ignition system 88 can provide an ignition spark to combustion chamber 30 via spark plug 92 in response to spark advance signal SA from controller 12, under select operating modes.

Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 58 upstream of emission control device 70. Sensor 126 may be any suitable sensor for providing an indication of exhaust gas air-fuel ratio such as a linear oxygen sensor or UEGO (universal or wide-range exhaust gas oxygen), a narrow band (older systems treat as a two-state device) oxygen sensor or EGO, a HEGO (heated EGO), a NOx, HC, or CO sensor. Emission control device 70 is shown arranged along exhaust passage 58 downstream of exhaust gas sensor 126. The emission control device 70 may be a three-way catalyst (TWC), SCR catalyst, NOx trap, a gasoline particulate filter (GPF), a combination of two or more of these devices, or one of various other emission control devices.

Further, engine 10 may include an exhaust gas recirculation (EGR) system (not shown) to help lower NOx and other emissions. The EGR system may be configured to recirculate a portion of exhaust gas from the engine exhaust to the engine intake. In one example, the EGR system may be a low pressure EGR system wherein exhaust gas is recirculated from downstream of gasoline particulate filter 70 to the engine intake.

The exhaust passage 58 may also include a muffler 71 and an active exhaust valve (also referred to as an exhaust tuning valve) 75 arranged downstream of the muffler 71. The exhaust passage 58 may also be referred to herein as an exhaust duct or exhaust pipe and may terminate at an exterior of the vehicle 5 as a (or coupled to) a tailpipe. A valve position sensor 76 may be coupled to the active exhaust valve 75 to determine a position of the valve 75. In one example, the active exhaust valve 75 may be a butterfly valve with a disc mounted on and revolving around a stem. In the closed state, the disc may completely block an opening of the valve and in the completely open state, the disc may be perpendicular to the plain of the valve opening to allow a maximum volume of fluid to flow through the opening. The active exhaust valve 75 may be part of an engine sound control system and by adjusting a position of the active exhaust valve 75, exhaust sound may be changed. In one example, an operator may select a level of desirable engine sound via an input to a dashboard console (not shown) (such as touchscreen on a human machine interface) or a smart device not shown) (such as smart phone, tablet) communicatively connected to the engine control system. In one example, the operator may select a minimum engine sound level, a maximum engine sound level, or an intermediate engine sound level (not shown). Based on the engine sound level selected, the controller may adjust an opening (not shown) of the active exhaust valve 75. As an example, the controller may use a look-up table (not shown) to determine the opening of the active exhaust valve 75 with the desired sound level as input and the active exhaust valve 75 position as output. The active exhaust valve 75 is further discussed in relation to FIG. 2.

The oxygen sensor(s) of vehicle 5 may be linear oxygen sensors or switching oxygen sensors. As an example, the oxygen sensors may be one of a UEGO sensor (universal or wide-range exhaust gas oxygen), a two-state oxygen sensor or EGO sensor, or a HEGO (heated EGO) sensor. Exhaust gas oxygen sensors 126 may assess a concentration of oxygen present in the exhaust gas and sense tailpipe exhaust oxygen concentrations about the emission control device 70. Exhaust gas sensor 126 may be a feed-gas oxygen sensor positioned upstream of emission control device 70 configured to sense feed-gas exhaust oxygen concentrations.

The air-fuel ratio of exhaust released from cylinders 30 may be determined by one or more of the oxygen sensors located in the exhaust stream of the engine. Based on the estimated exhaust air-fuel ratio, fuel injection to engine cylinders may be adjusted so as to control the air-fuel ratio of cylinder combustion. For example, fuel injection amounts to the cylinders may be adjusted based on a deviation of the exhaust air-fuel ratio, estimated based on the output of exhaust gas sensor 126 and a desired air-fuel ratio (such as a deviation from stoichiometry).

Vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 40 of engine 10 and electric machine 53 are connected via a transmission 57 to vehicle wheels 55 when one or more clutches 56 are engaged. In the depicted example, a first clutch 56 is provided between crankshaft 40 and electric machine 53, and a second clutch 56 is provided between electric machine 53 and transmission 57. Controller 12 may send a signal to an actuator of each clutch 56 to engage or disengage the clutch, so as to connect or disconnect crankshaft 40 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a microcomputer, including microprocessor unit 102, input/output ports 104, an electronic storage medium for executable programs and calibration values shown as read only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; position of the active exhaust valve 75 from position sensor 76; exhaust temperature in the exhaust manifold from sensor 72, and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Further, the controller 12 may receive one or more of a crankshaft acceleration signal from a crankshaft acceleration sensor, a vehicle wheel speed signal from a wheel speed sensor (not shown), steering movements from a steering sensor (not shown), and angular velocity and slip-angle of a yaw sensor (not shown). Additionally, controller 12 may communicate with a cluster display device, for example to alert the driver of faults in the engine or exhaust system. Storage medium read-only memory 106 can be programmed with computer readable data representing instructions executable by processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting engine sound level may include actuating the active exhaust valve 75 to adjust the amount of exhaust gas flowing through the active exhaust valve 75.

A navigation system 150 may be coupled to the controller 12 to determine a real-time location of the vehicle 5 at any given time (such as during vehicle travel) via a global positioning satellite (GPS) system. The navigation system may be connected to an external server and/or network cloud via wireless communication. The controller 12 may be coupled to a wireless communication device for direct communication of the vehicle 5 with a network cloud. Using the wireless communication device and the navigation system 150, the controller 14 may retrieve road conditions (such as road roughness), traffic conditions, elevation, and other travel conditions.

Figure 2:
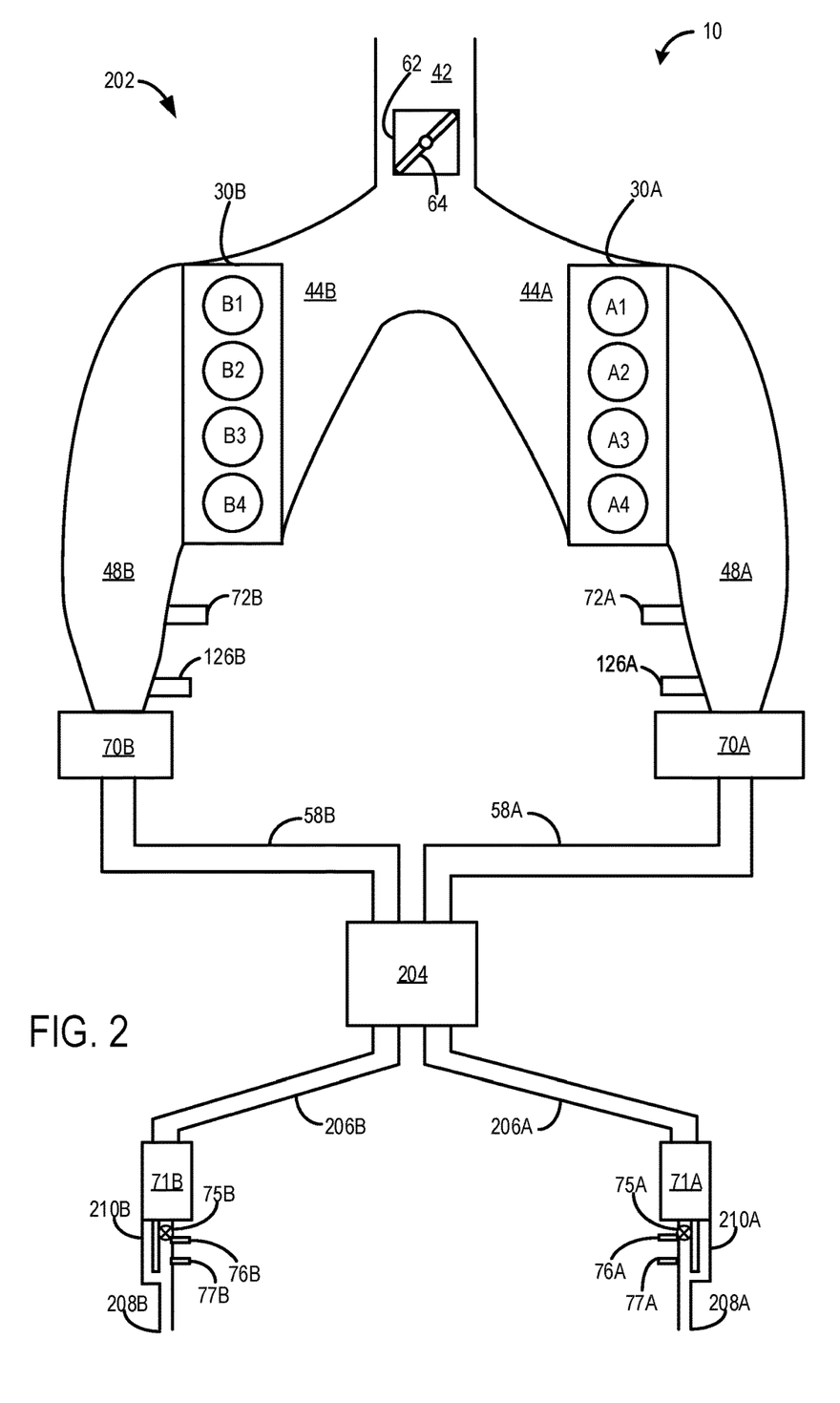
FIG. 2 schematically shows a V-engine with a dual bank exhaust system

Turning to FIG. 2, an example version of engine 10 that includes multiple cylinders arranged in a V configuration (e.g., V-Engine) is shown as V-engine 202. Engine 202 includes a plurality of combustion chambers or cylinders. The plurality of cylinders of engine 202 are arranged as groups of cylinders on distinct engine banks. In the depicted example, engine 202 includes two engine cylinder banks 30A, 30B. Thus, the cylinders are arranged as a first group of cylinders (four cylinders in the depicted example) arranged on first engine bank 30A and label A1-A4, and a second group of cylinders (four cylinders in the depicted example) arranged on second engine bank 30B labeled B1-B4. It will be appreciated that while the example depicted in FIG. 1 shows a V-engine with cylinders arranged on different banks, this is not meant to be limiting, and in alternate examples, the engine may be an in-line engine with all engine cylinders on a common engine bank.

Engine 202 can receive intake air via an intake passage 42 communicating with branched intake manifold 44A, 44B. Specifically, first engine bank 30A receives intake air from intake passage 42 via a first intake manifold 44A while second engine bank 30B receives intake air from intake passage 42 via second intake manifold 44B. While engine banks 30A, 30B are shown with a common intake manifold, it will be appreciated that in alternate examples, the engine may include two separate intake manifolds. The amount of air supplied to the cylinders of the engine can be controlled by adjusting a position of throttle 62 on throttle plate 64. Additionally, an amount of air supplied to each group of cylinders on the specific banks can be adjusted by varying an intake valve timing of one or more intake valves coupled to the cylinders.

Combustion products generated at the cylinders of first engine bank 30A are directed to one or more emission control devices in first exhaust manifold 48A where the combustion products are treated before being vented to the atmosphere. A first emission control device 70A is coupled to first exhaust manifold 48A. First emission control device 70A may include one or more exhaust catalysts. Exhaust gas generated at first engine bank 30A is treated at emission control device 70A Combustion products generated at the cylinders of second engine bank 30B are exhausted to the atmosphere via second exhaust manifold 48B. A second emission control device 70B is coupled to second exhaust manifold 48B. Second emission control device 70B may include one or more exhaust catalysts. Exhaust gas generated at second engine bank 30B is treated at emission control device 70B.

While FIG. 2 shows each engine bank coupled to respective underbody emission control devices, in alternate examples, each engine bank may be coupled to respective emission control devices 70A, 70B but to a common underbody emission control device positioned downstream in a common exhaust passageway.

Various sensors may be coupled to engine 202. For example, a first exhaust gas sensor 126A may be coupled to the first exhaust manifold 48A of first engine bank 30A, upstream of first emission control device 70A while a second exhaust gas sensor 126B is coupled to the second exhaust manifold 48B of second engine bank 30B, upstream of second emission control device 70B. In further examples, additional exhaust gas sensors may be coupled downstream of the emission control devices. Still other sensors, such as temperature sensors, may be included, for example, coupled to the underbody emission control device(s). As elaborated in FIG. 2, the exhaust gas sensors 126A and 126B may include exhaust gas oxygen sensors, such as EGO, HEGO, or UEGO sensors.

As shown in FIG. 2, the exhaust passages 58A, 58B of each bank may converge at a resonator 204. However, in alternate embodiments, the resonator may not be included in engine 202. After the resonator, the exhaust flow is split up into a first exhaust pipe 206A (on the first engine bank side) and second exhaust pipe 206B (on the second engine bank side), which may be continuations of the respective exhaust passages. First exhaust pipe 206A includes a first muffler 71A and a first active exhaust valve 75A positioned downstream of the first muffler 71A. When the first active exhaust valve 75A is open, exhaust flow exits the first muffler 71A via the first active exhaust valve 75A and continues on to a first outlet 208A of the first exhaust pipe 206A (which may be coupled to a first tailpipe). However, when the first active exhaust valve 75A is closed, the exhaust flow exits the first muffler 71A via a first bypass duct 210A. In this closed position, exhaust flow may be restricted via first bypass duct 210A. Similarly, second exhaust pipe 206B includes a second muffler 71B and a second active exhaust valve 75B positioned downstream of the second muffler 71B. Second active exhaust valve 75B functions similarly to first active exhaust valve 75A, as described above, and a second bypass duct 210B is included around second active exhaust valve 75B. The first active exhaust valve 75A and the second active exhaust valve 75B may be used similarly to the active exhaust valve 75 of FIG. 1.

The controller may adjust the positions of the first active exhaust valve 75A and the second active exhaust valve 75B (e.g., between open and closed) in order to control exhaust noise to a desired level (e.g., based on engine operating conditions). As an example, the exhaust noise level may be higher when each of the first active exhaust valve 75A and the second active exhaust valve 75B are open relative to the exhaust noise level when each of the first active exhaust valve 75A and the second active exhaust valve 75B are closed. Closing of one or more of the first active exhaust valve 75A and the second active exhaust valve 75B may attenuate the audible exhaust noise.

In dual bank exhaust systems, as shown in FIG. 2, both active exhaust valves (e.g., valve 75A and valve 75B shown in FIG. 2), on the separate banks, are configured to behave uniformly to achieve uniform exhaust sound levels. For example, the two active exhaust valves may be commanded to a same position (e.g., open or closed) in order to achieve a desired and uniform exhaust sound level.

A first position sensor 76A may be coupled to the first active exhaust valve 75A and a second position sensor 76B may be coupled to the first active exhaust valve 75B. Positions of the first active exhaust valve 75A and the second active exhaust valve 75B may be estimated based on inputs from the first position sensor 76A and the second position sensor 76B, respectively. In one example, as an active exhaust valve is commanded to move from an open position to a closed position, the change in valve position may be tracked via the corresponding position sensor. If during travel, a contaminant (such as gravel) is lodged in the body of an active exhaust valve, the valve door (disc of the butterfly valve) may not be able to traverse over an entire range of motion (such as from open to closed) and may only move to an intermediate position upon being commanded to a desired position.

A degradation of the exhaust active valve may be inferred based on input of the corresponding position sensor. As an example, during monitoring of the first active exhaust valve 75A, the first active exhaust valve 75A may be commanded to move from a first position to a second position, a position of the first active exhaust valve 75A may be monitored during the movement via the first valve position sensor 76A, and a degradation of the first active exhaust valve 75A may be detected in response to the first active exhaust valve 75A being stuck at a third position, the third position being between the first position and the second position. Upon detection of a degradation of the active exhaust valve during the monitoring of the valve, operation of the engine sound control system may be deactivated, and the active exhaust valve may be operated for a first time in a healing mode. The healing mode may include sending duty cycling commands to the actuator coupled to the valve one or more times to dislodge contaminant from a body of the active exhaust valve. As an example, during each duty cycle, the valve may be actuated from a fully closed position to a fully open position.

Upon detection of the degradation of the active exhaust valve after the first operation in the healing mode, a timer may be set, the valve may be periodically monitored over a threshold duration, a timer signal of the detected degradation may be plotted, and upon completion of the threshold duration, a slope of the timer signal may be estimated. If the slope is lower than one, the active exhaust valve may be detected to be intermittently degraded and if the slope is one, the active exhaust valve may be detected to be permanently degraded. A method for differentiating between a permanent degradation and an intermittent degradation is discussed with relation to FIG. 3.

Upon detection of the active exhaust valve being intermittently degraded, a route segment with road conditions including one or more of a rough road condition and a higher than threshold road gradient/curvature or vehicle operating conditions including a higher than threshold rate of vehicle acceleration/deceleration and a higher than threshold vehicle speed may be identified based on inputs from one or more of an on-board navigation system and an external server. The active exhaust valve may be operated for a second time in the healing mode during the identified route segment. Upon detection of the intermittent degradation of the active exhaust valve during monitoring of the valve even after operating the active exhaust valve for the second time in the healing mode, the active exhaust valve may be operated for a third time in the healing mode after a threshold duration has elapsed or a threshold distance has been traveled since the immediately previous operation of the active exhaust valve in the healing mode. During monitoring of the valve after operating the active exhaust valve for the third time in the healing mode, upon detection that the active exhaust valve is no longer degraded, operation of the engine sound control system may be reactivated. However, if it is detected that even after operating the intermittently degraded valve in the healing mode three times, the degradation is not cleared, the active exhaust valve may be indicated to be permanently degraded and actuation of the active exhaust valve may be deactivated and a diagnostic code may be set. A method for mitigation of an intermittent degradation is discussed with relation to FIG. 4.

Various temperature sensors may be included in the exhaust system of engine 202, including exhaust manifold temperature sensors 72A and 72B (adapted to measure temperature of exhaust gas within the exhaust manifold to which they are coupled) and exhaust gas temperature sensors 77A and 77B (adapted to measure the exhaust temperature downstream of the active exhaust valve proximate to where it is positioned). In alternate embodiments, the exhaust system may not include some or all of these temperature sensors, and instead, temperatures may be modeled based on other engine operating conditions, as explained further herein.

In this way, the components of FIGS. 1 and 2 enable an on-board controller 12 including computer-readable instructions stored on non-transitory memory to: in response to an active exhaust valve coupled to an exhaust passage downstream of a muffler being stuck, identify a road segment (not shown) with one or more of rough road condition, a higher than threshold gradient, and a higher than threshold curvature via input from one or more of an on-board navigational system, an external server (not shown), a crankshaft acceleration sensor, a wheel speed sensor (not shown), a steering sensor (not shown), and a yaw sensor (not shown), identify an vehicle operating condition with a higher than threshold vehicle acceleration/deceleration rate and/or a higher than threshold vehicle speed via input from one or more of the on-board navigational system or the external server (not shown), the crankshaft acceleration sensor, the wheel speed sensor, and the steering sensor, and actuate the active exhaust valve from a closed position to an open position a plurality of times during one of the identified road segment and the vehicle operating condition to remove a contaminant stuck in a body of the active exhaust valve.

Figure 3:
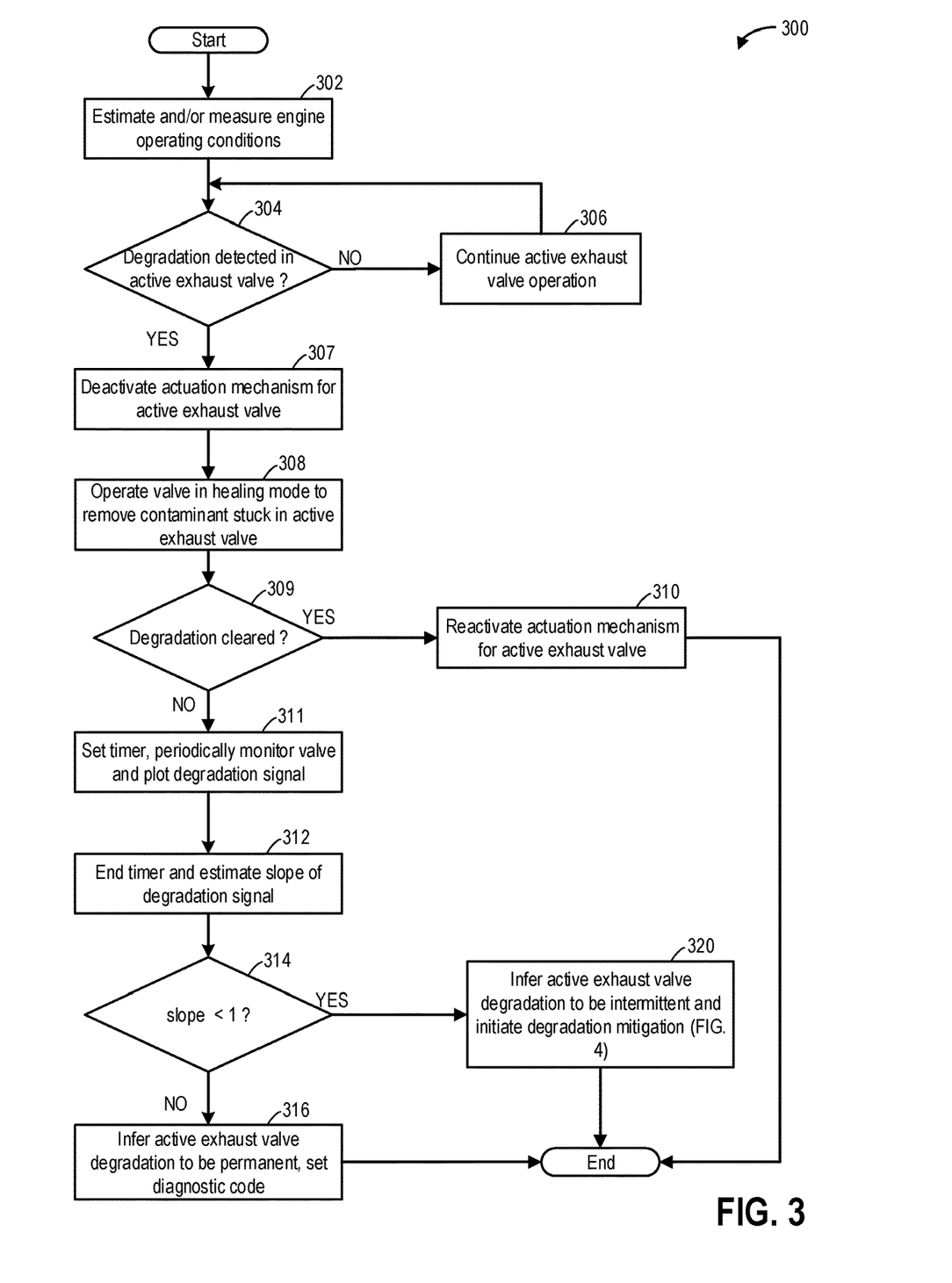
FIG. 3 shows a flow chart of an example method for differentiating between a permanent degradation and an intermittent degradation of an active exhaust valve.

FIG. 3 shows a flow chart of a method 300 for detecting a degradation of an active exhaust valve and determining if the degradation is a permanent degradation or an intermittent fault. As explained above, an exhaust system of a vehicle may have one or more active exhaust valves (also referred to as exhaust tuning valves) adapted to control exhaust noise to a desired level (such as active exhaust valve 75 shown in FIG. 1 or active exhaust valves 75A and 75B shown in FIG. 2). Instructions for carrying out method 300 and the rest of the methods included herein may be executed by a controller based on instructions stored on a memory of the controller and in conjunction with signals received from sensors of the engine system, such as the sensors described above with reference to FIGS. 1 and/or 2. The controller may employ engine actuators of the engine system to adjust engine operation, according to the methods described below.

The method begins at 302 and includes estimating and/or measuring engine operating conditions. Engine operating conditions may include engine speed and/or load, engine temperature, ambient temperature, exhaust manifold temperature, exhaust temperatures in the exhaust pipes, gas pressures, mass air flow, etc. A position (initial position) of the one or more active exhaust valves, corresponding to a desired level of engine sound, may be estimated based on input from an exhaust valve position sensor (such as valve position sensor 76 shown in FIG. 1 or valve position sensors 76A and 76B shown in FIG. 2).

At 304, the routine includes determining if a degradation is detected in an active exhaust valve. When an active exhaust valve is actuated to a commanded position but the valve does not reach the commanded position such as when the valve moves form an initial position to an intermediate position (instead of moving to a commanded, final position), it may be inferred that the active exhaust valve is degraded. The initial position and the intermediate position of the active exhaust valve may be estimated via inputs from a valve position sensor coupled to the respective active exhaust valve. A degradation may be detected if during monitoring of the valve, the final position (the position at which the valve stops further movement) of the valve is different from the commanded position. A valve monitoring may be carried out by commanding the valve to move from a completely closed position to a completely open position. Valve monitoring may be carried out via a high level driver software (not shown) communicatively coupled to the actuator of the valve. As an example, the high level driver software may relay the health of the valves by providing frequency of a motor feedback signal (not shown) during the valve monitoring, where 160 Hz may correspond to a mechanically stuck valve and 200 Hz may correspond to a functioning valve. In further example, if the frequency of a motor feedback signal during the valve monitoring is 140 Hz, valve alignment issues may be indicated, and if frequency of a motor feedback signal (not shown) during the valve monitoring is 180 Hz, higher temperature issues may be indicated. A valve monitoring may be periodically carried out to ensure that the valve is operating over the entire range of motion. A completely closed position of the valve may include where a minimum amount of exhaust gas flows through the valve. In one example, the minimum amount is zero. The completely open position of the valve may include where a maximum amount of exhaust gas flows through the valve. If the valve is degraded, the valve may be blocked from moving to one of the completely closed position or the completely open position due to a particle reducing its range of motion. In a degraded state, the active exhaust valve may still be actuated but the range of motion of the valve may be reduced and it may not be possible to actuate the valve to a commanded position corresponding to a desired sound level.

If it is determined that the valve is able to shift from the initial position to the commanded position, it is inferred that the valve is not degraded and at 306, operation of the active exhaust valve may be continued without operating the active exhaust valve in a healing mode. In response to a desired sound level selected by an operator (such as via input to a dashboard panel), the opening of the active exhaust valve may be adjusted such that the desirable level of engine (exhaust) sound is audible. As an example, the controller may use a look-up table to determine the opening of the active exhaust valve corresponding to a desired (as indicated by operator) sound level with the desired sound level as input and the active exhaust valve position as output. In this way, by adjusting the active exhaust valve, an engine sound control system may be operated. If it is determined that a degradation is detected in an active exhaust valve, at 307, the actuation mechanism for the active exhaust valve may be deactivated and the valve position may no longer be changed to alter the desired engine sound level. The operator may be notified via a message in the dashboard console and/or smart device communicatively coupled to the engine control system that the engine sound control system is temporarily unavailable and the operator may not be able to change the level of audible engine sound.

At 308, the active exhaust valve may be operated in a healing mode for a first time to remove any contaminants that may have been stuck in the active valve, thereby causing the valve to be restricted in motion. Operating the active exhaust valve in the healing mode may include duty cycling the valve a plurality of times from a closed position to an open position. As an example, the controller may actuate the valve from a 10% open position to an 80% open position. In one example, each operation in the healing mode may include duty cycling the valve 6-18 times (such as 10 times). Each duty cycle may be carried out in succession without a gap in between two consecutive duty cycles. By repeatedly trying to move the position of the valve (disc of the butterfly valve), any contaminant\particle stuck in the valve body may be dislodged and removed from its position.

At 309, the routine includes determining if the degradation of the active exhaust valve has been cleared. A degradation detection test (valve monitoring) may be carried out where the valve is commanded to actuate from a completely closed position to a completely open position and the valve position is continually monitored via the valve position sensor. A degradation may be detected if the valve is not able to move from the closed to the open position and is stuck at an intermediate position. If the valve position shifts from the closed to the open position, it may be inferred that during the first operation of the valve in the healing mode, any contaminant present in the valve has been dislodged and the valve has regained its entire range of motion.

If it is determined that the degradation has been cleared and the active exhaust valve is able to move from a closed position to an open position without any hurdles, at 310, the actuation mechanism for the active exhaust valve mechanism may be reactivated. The operator may be notified via a message in the dashboard console and/or smart device communicatively coupled to the engine control system that the engine sound control system is available and the operator may change the level of audible engine sound via inputs to the dashboard console or smart device. In response to a desired sound level selected by an operator, the opening of the active exhaust valve may be adjusted such that the desirable level of engine (exhaust) sound is audible.

If it is determined that the degradation has not been cleared, at 311, a timer may be set, degradation detection may be periodically carried out, and a plot of the degradation signal may be plotted for carrying out a slope based diagnostics. A degradation detection test may be periodically carried out over a threshold duration. The threshold duration may be calibrated based on a time needed for each degradation detection tests and the number of tests to be conducted for differentiation between an intermittent degradation and a permanent degradation. Each degradation detection test may include commanding the valve to actuate from a completely closed position to a completely open position and continually monitoring valve position via the valve position sensor. A degradation may be detected if the valve is not able to move from the closed to the open position and is stuck at an intermediate position. A degradation may be an intermittent degradation such as when a recurring degradation is detected in the valve but the degradation is not constant. Said another way, the degradation may be termed as an intermittent degradation when the valve may be operational (non-degraded) occasionally and non-operational (degraded) at other times. A degradation may be termed as permanent if the degradation is consistently observed in the valve and the valve is non-operational throughout the degradation detection time period. To carry out the slope based diagnostics, a plot of the condition of the valve (such as degraded and non-degraded) versus time may be generated.

At 312, once the threshold duration has elapsed, the timer may end. The slope of the degradation timer signal may be estimated. For a permanently degraded valve, the slope may be one, whereas for an intermittently degraded valve, the slope may be less than one. At 314, the routine includes determining if the slope of the degradation timer signal is less than one. If it is determined that the slope of the degradation timer signal is less than one, at 320, it may be inferred that the active valve degradation may be intermittent. An intermittent degradation may be mitigated by opportunistically or periodically operating the active exhaust valve in the healing mode. The mitigation method for the intermittent degradation is discussed in FIG. 4. However, it is determined that the slope of the degradation timer signal is not less than one, it may be inferred that the slope is one. At 316, based on the slope being one, it may be inferred that the degradation is a permanent degradation and a diagnostic code (flag) may be set indicating that the active exhaust valve is degraded. The actuation mechanism for the active exhaust valve may be maintained deactivated and the valve position may no longer be changed to alter the desired engine sound level until the active exhaust valve is serviced/replaced.

In this way, during a first condition, a travel segment may be identified with increased engine vibrations or higher than threshold ambient wind speed, and during the predicted travel segment, an opening of an active exhaust valve coupled to an exhaust passage downstream of a muffler may be adjusted to dislodge a contaminant in a body of the active exhaust valve, and during a second condition, a diagnostic code may be set indicating degradation of the active exhaust valve and operation of the active exhaust valve disabled. The first condition includes the active exhaust valve being intermittently stuck at a position during actuation of the valve from a closed position to an open position at a first, higher frequency, and the second condition includes the active exhaust valve being continually stuck at the position during the actuation of the valve from the closed position to the open position. The adjusting of the valve to dislodge the contaminant may include duty cycling the active exhaust valve (actuate the valve from the closed position to the open position) repeatedly a plurality of times.

Moving to FIG. 5, an example 500 differentiation is shown between a permanent degradation and an intermittent degradation. The x-axis denotes time and time markers t1-t9 denote times at which a degradation detection test is carried out. The time period between time t1 and t9 is the threshold duration within which the slope based diagnostics is carried out to differentiate between a permanent degradation and an intermittent degradation.

The first plot, line 502, shows degradation detection for a first active exhaust valve. Line 502 shows if the valve is detected to be degraded or non-degraded. The second plot, line 504, shows a degradation timer signal corresponding to the state (vaulted/not-degraded) of the first active exhaust valve. The timer is active (accumulating time) when the valve is in degraded state and the timer is paused (plateau) when the valve is non-degraded. A degradation detection test may be carried out at each time point marked by a dotted line (t1-t9). Additional degradation detections may also be carried out between two consecutive time points. A degradation detection test (also referred herein as valve monitoring) may include commanding the valve to actuate from a completely closed position to a completely open position and continually monitoring valve position via the valve position sensor. A degradation may be detected if the valve is not able to move from the closed to the open position and is stuck at an intermediate position. A degradation may also be detected using a high level driver software communicatively coupled to the valve actuator based on a frequency of motor feedback signal. The valve may be non-degraded when the feedback signal is 200 Hz and the valve may be degraded when the feedback signal is 160 Hz.

Prior to the time of the first degradation detection test (at time t1), the valve may operate without any degradation (non-degraded state). At time t1, it is detected, via a degradation detection test, that the valve is degraded. Between time t1 and t2, the valve is continued to be detected as degraded. At time t2, it is detected, via a degradation detection test, that the valve is non-degraded. Subsequently, at time t3, the valve is detected to be degraded, at time t4, the valve is detected to be non-degraded, at time t5, the valve is detected to be degraded, at time t6, the valve is detected to be non-degraded, at time t7, the valve is detected to be degraded, at time t8, the valve is detected to be non-degraded, and at time t9, the valve is detected to be degraded. Corresponding to each change in state of the valve, as detected by a degradation detection test (between time t1 and t9), the degradation timer signal is generated and traced in the line (plot) 504. An accumulated slope of the line 504 is estimated to be less than one, thereby confirming that the first active exhaust valve is intermittently degraded.

The third plot, line 506, shows degradation detection for a second active exhaust valve. The fourth plot, line 508, shows a degradation timer signal corresponding to the state (vaulted/not-degraded) of the first active exhaust valve. A degradation detection test may be carried out at each time point marked by a dotted line (t1-t9). Prior to the time of the first degradation detection test (at time t1), the valve operates without any degradation (non-degraded state). At time t1, it is detected, via a degradation detection test, that the valve is degraded and at each subsequent degradation detection test (between time t1 and t9), the valve is detected to be degraded. Since the valve continues to be degraded after time t1, the degradation time signal continues to increase at a constant rate. An accumulated slope of the line 508 is estimated to be one, thereby confirming that the first active exhaust valve is permanently degraded.

Figure 4:
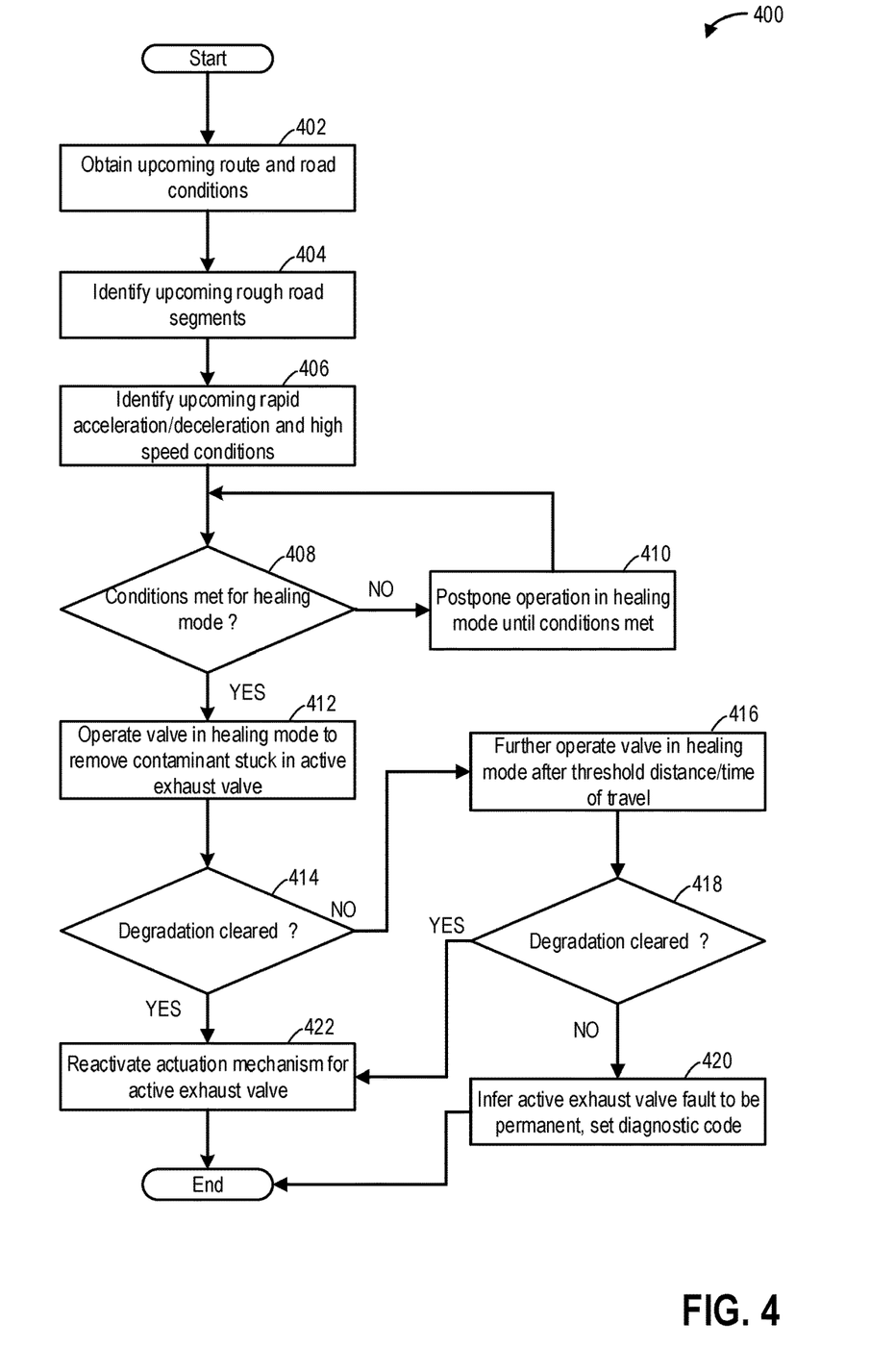
FIG. 4 shows a flow chart of an example method for mitigating an intermittent degradation of the active exhaust valve.

FIG. 4 shows an example method 400 for mitigating an intermittent degradation of the active exhaust valve as detected at step 320 of FIG. 3. As an example, the method 400 may be a continuation of 300 of FIG. 3 and may be carried out at step 320.

At 402, upcoming route and road conditions may be obtained from a navigation system (e.g., global positioning system) or a network cloud communicatively coupled to the vehicle control system. In one example, the controller on-board the vehicle may include a navigation system (e.g., global positioning system) via which a location of the vehicle (e.g., GPS co-ordinates of the vehicle) may be transmitted to an external server over a network. Based on the location of the vehicle, local road roughness conditions for that location may be retrieved from the external server. Further still, the navigation system may be used to plan a route of travel for the vehicle and based on the planned route, road conditions for the entirety of the route may be retrieved. In one example, the operator may input a destination in the on-board navigation system via the dashboard console or a smart device coupled to the navigation system. If a destination is not known, road conditions for the immediately upcoming road segment (such as next 500 m) may be retrieved via a remote sensing method such as Light Detection and Ranging (LIDAR). The road conditions obtained may include, road roughness information, elevation, road gradient, road curvature, and traffic information. Further, weather information such as rain/snow forecast may be obtained from the external server.

At 404, upcoming rough road segments may be identified. This may include receiving an estimate of regions in the upcoming route where the expected road roughness is higher e.g., road roughness index is higher than a threshold roughness. The threshold roughness may be pre-calibrated as the roughness which may cause increased vibrations in the engine exhaust system. At 406, upcoming road segments may be identified at which rapid (higher than threshold rate) acceleration/deceleration may occur. Rapid acceleration may occur during downhill slopes and rapid declaration may occur due to traffic conditions. Also, road segments may be identified where the vehicle may operate at a higher than threshold speed (such as during travel on freeways). The rapid acceleration/deceleration and/or higher speed vehicle operation may increase vibration in the exhaust system and also allow higher rate of ambient air flow through the tailpipe.

At 408, the routine includes determining if conditions are met for operating the active exhaust valve in the healing mode for a second time. The conditions may include one or more of vehicle travel on road segments with rough road conditions and road segments with bends/curves.

In one example, road conditions (such as roughness and curvature) may be estimated in real time based on inputs from a plurality of vehicle sensors. In one example, a road roughness index may be determined. The indication of road roughness and curvature may be based on one or more of crankshaft acceleration, vehicle wheel speed, horizontal and vertical accelerations, steering movements, wheel slippage, angular velocity, and slip-angle. For example, one or more of crankshaft acceleration as measured by the crankshaft position sensor, vehicle wheel speed as estimated by the wheel speed sensor(s) (not shown), steering movements as determined from the steering wheel sensor (not shown), angular velocity and slip-angle of the vehicle as measured by the yaw-rate sensor (not shown), and horizontal and vertical accelerations as measured by acceleration sensors not shown) may be utilized in estimating road roughness and curvature. Road roughness and curvature estimation may also be based on input from additional engine sensors. Alternatively, the indication of road roughness and curvature may be based on navigational input. In one example, the controller on-board the vehicle may include a navigation system (e.g., global positioning system, GPS) via which a location of the vehicle (e.g., GPS co-ordinates of the vehicle) may be transmitted to an external server (not shown) over a network (not shown). Based on the location of the vehicle, local road conditions for that location may be retrieved from the external server (not shown).

In another example, the on-board vehicle controller may be communicatively coupled to the on-board controller of one or more other vehicles, such as using vehicle to vehicle (V2V) communication technology. The one or more other vehicles may include other vehicles within a threshold radius of the given vehicle and having the same make or model. Road conditions may be retrieved from one or more vehicles within a threshold radius of the given vehicle. For example, a statistical or weighted average of the values retrieved from one or more vehicles may be used to estimate the road roughness and/or curvature conditions. In yet another example, the road roughness conditions may be previously identified (in step 404).

The conditions also include vehicle operation with rapid acceleration/deceleration, high speed operation of the vehicle, and other vehicle operating conditions when engine vibration may increase. In one example, the acceleration/deceleration and high speed operation of the vehicle may be identified in real time based on one or more of crankshaft acceleration, wheel speed, steering movements. In another example, the rapid acceleration/deceleration and high speed vehicle operating conditions may be previously identified (in step 406).

Further, the conditions may include ambient conditions when the wind speed is higher than a threshold speed such that gusts of air may flow through the exhaust passage. Said another way, the condition at which the valve may be operated in the healing mode may correspond to increased engine vibration and/or increased air flow through the engine exhaust system. The conditions may additionally include a higher than threshold duration (such as higher than 60 minutes) or a longer than threshold distance (such as greater than 100 miles) of travel since the first operation of the valve in the healing mode (such as carried out at step 308 of FIG. 3).

If it is determined that the conditions are not met for operating the active exhaust valve in the healing mode for a second time, at 410, the operation in the healing mode may be postponed until at least one of the abovementioned conditions are met. If it is determined that the conditions are met for operating the active exhaust valve in the healing mode for a second time, at 412, the valve may again be operated in the healing mode to remove any contaminant stuck in an active exhaust valve of the exhaust system. Operation of the active exhaust valve in the healing mode may include duty cycling the intermittently degraded active exhaust valve a plurality of times from a 10% opening to an 80% opening at a diagnostic carrier frequency. The controller may actuate the valve from a 10% open position to an 80% open position. In one example, operation in the healing mode may include duty cycling the valve 12 times. The 12 duty cycles may be carried out in quick succession without a gap between consecutive duty cycles. By repeatedly trying to move the position of the valve (disc of the butterfly valve) during engine vibration and/or gusts of air through the exhaust flow, any contaminant stuck in the valve body may be dislodged and removed from its position.

Upon completion of the operation of the active exhaust valve in the healing mode for a second time, at 414, the routine includes determining if the degradation of the active exhaust valve has been cleared. A degradation detection test may be carried out where the valve is commanded to actuate from a completely closed position to a completely open position and the valve position is continually monitored via the valve position sensor. A degradation may be detected if the valve is not able to move from the closed to the open position and is stuck at an intermediate position. If the valve position shifts from the closed to the open position without any hurdles, it may be inferred that during second operation of the active exhaust valve in the healing mode, any contaminant present in the valve has been dislodged and the valve has regained its entire range of motion.

If it is determined that the degradation has been cleared and the active exhaust valve is able to uninterruptedly move from a closed position to an open position, at 422, the actuation mechanism for the active exhaust valve mechanism may be reactivated. The operator may be notified via a message in the dashboard console and/or smart device communicatively coupled to the engine control system that the engine sound control system is available for operation and the operator may change the level of audible engine sound via inputs to the dashboard console or smart device. In response to a desired sound level selected by an operator, the opening of the active exhaust valve may be adjusted such that the desirable level of engine (exhaust) sound is audible.

If it is determined that the degradation has not been cleared, at 416, operation of the active exhaust valve in the healing mode may be repeated after a threshold duration (such as higher than 60 minutes) or threshold distance (such as greater than 100 miles) has elapsed since the immediately previous (second) operation of the valve in the healing mode. Upon completion of operation of the active exhaust valve in the healing mode for a third time, at 418, the routine includes determining if the degradation of the active exhaust valve has been cleared. The degradation detection may be carried out by the method described in step 414. If it is determined that the degradation has been cleared, the routine may proceed to step 422 and the actuation mechanism for the active exhaust valve may be reactivated. If it is determined that the degradation of the active exhaust valve persists after operating the active exhaust valve in the healing mode three times, at 420, the degradation of the active exhaust valve may be inferred to be permanent and a diagnostic code (flag) may be set. The actuation mechanism for the active exhaust valve may be maintained deactivated and the valve position may no longer be changed to alter the desired engine sound level until the active exhaust valve is serviced/replaced.

FIG. 6 shows an example timeline 600 illustrating mitigation of an intermittent degradation detected in an active exhaust valve coupled to an engine exhaust passage downstream of a muffler. The horizontal (x-axis) denotes time and the vertical markers t1-t3 identify significant times in the routine for valve degradation mitigation.

The first plot, line 602, denotes a position of an accelerator pedal as estimated via a pedal position sensor. The second plot, line 604, denotes vehicle speed as estimated via a vehicle speed sensor. The third plot, line 606, shows operation of the active exhaust valve in the healing mode to dislodge any contaminant stuck in a body of the active exhaust valve. Operating the active exhaust valve in the healing mode includes duty cycling the valve twelve times to dislodge contaminant from a body of the active exhaust valve. In each duty cycle, the opening of the valve may be continually changed from a 10% opening to an 80% opening. The fourth plot, line 608, denotes monitoring (diagnostics) the active exhaust valve. The monitoring of the active exhaust valve includes detecting that the active exhaust valve is degraded in response to a frequency of a motor feedback signal of a high level driver software communicatively coupled to the actuator being equal to a first calibrated value and indicating that the valve is not degraded in response to the frequency of the motor feedback signal being equal to a second calibrated value. The first calibrated value is 160 Hz and the second calibrated value is 200 Hz. The fifth plot, line 610, denotes a flag such as a diagnostic code that can be set indicating degradation of the active exhaust valve. The sixth plot, line 612, denotes operation of an engine sound control system. The active exhaust valve is part of the engine sound control system and the position of the valve is adjusted based on inputs to the engine sound control system to adjust a level of audible engine exhaust sound.

Prior to time t1, an intermittent degradation of the active exhaust valve has been detected and the engine sound control system has been temporarily deactivated until the degradation of the valve is cleared. The flag is maintained in the off position since the degradation of the active exhaust valve has not been characterized as a permanent fault. At time t1, a rapid acceleration along with an increased vehicle speed is identified. The valve is operated in the healing mode during the acceleration and increased vehicle speed operation to dislodge any contaminant stuck in the valve body.

Between time t1 and t2, the rapid acceleration and increased vehicle speed cause an increase in vibration in the engine exhaust system causing the contaminant to be removed from its position in the valve body when the valve is repeatedly actuated to move between an open and a closed position.

At time t2, upon completion of a threshold duration and twelve duty cycles of the valve, the healing mode is deactivated and monitoring of the valve is carried out to determine if the contaminant has been removed and the degradation is cleared during the immediately previous operation of the valve in the healing mode. In response to the motor feedback signal of the high level driver software communicatively coupled to the actuator being equal to the second calibrated value indicating ability of the active exhaust valve to move from a closed position to an open position without getting stuck at any intermediate position, it is inferred that the degradation has been cleared. In response to clearing of the fault, at t3, the engine sound control system is reactivated and the operator can select a desirable level of audible engine sound. Also, since the degradation is confirmed not to be a permanent fault, the flag is maintained in an off position.

In this way, by duty cycling an intermittently stuck active exhaust valve, the contaminant causing the valve to get stuck may be effectively removed and operation of the valve may be resumed within a drive cycle. By operating the valve in the healing mode during specific driving conditions with a higher propensity for engine vibration the stuck particle may be forced out of the valve. Overall, by mitigating the degradation within the drive cycle without external intervention, operation of the engine sound control system may be resumed, thereby improving operator satisfaction.

An example method for an engine comprises: in response to detection of an intermittent degradation of an active exhaust valve, adjusting actuation of the valve based on a vehicle operating condition and a road condition. In any preceding example, additionally or optionally, the active exhaust valve is coupled to an exhaust passage downstream of a muffler and an opening of the active exhaust valve is adjusted responsive to inputs to an engine sound control system for adjusting audible exhaust sound. In any or all of the preceding examples, additionally or optionally, adjusting actuation of the valve includes sending duty cycling commands to an actuator coupled to the active exhaust valve responsive to the intermittent degradation. In any or all of the preceding examples, additionally or optionally, the duty cycling commands are sent to the actuator to gradually change an opening of the valve from a 10% opening to an 80% opening. In any or all of the preceding examples, the method further comprising, additionally or optionally, upon detection of a degradation of the active exhaust valve during monitoring of the active exhaust valve, deactivating operation of the engine sound control system, and operating the active exhaust valve for a first time in a healing mode, wherein the healing mode includes sending the duty cycling commands to the actuator one or more times to dislodge contaminant from a body of the active exhaust valve. In any or all of the preceding examples, additionally or optionally, the monitoring of the active exhaust valve includes commanding the active exhaust valve to move from a first position to a second position, monitoring a position of the active exhaust valve during the movement via a valve position sensor, and detecting the degradation of the active exhaust valve in response to the active exhaust valve being stuck at a third position, the third position being between the first position and the second position. In any or all of the preceding examples, additionally or optionally, the monitoring of the active exhaust valve further includes detecting degradation of the active exhaust valve in response to a frequency of a motor feedback signal of a high level driver software communicatively coupled to the actuator being equal to a calibrated value. In any or all of the preceding examples, the method further comprising, additionally or optionally, upon detection of the degradation of the active exhaust valve after the first operation in the healing mode, setting a timer, periodically monitoring the valve over a threshold duration, plotting a timer signal of the detected degradation, and upon completion of the threshold duration, estimating a slope of the timer signal, and in response to the slope being lower than one, detecting the active exhaust valve to be intermittently degraded. In any or all of the preceding examples, the method further comprising, additionally or optionally, in response to the slope being one, indicating the active exhaust valve to be permanently degraded, deactivating actuation of the active exhaust valve, and setting a diagnostic code. In any or all of the preceding examples, additionally or optionally, the road condition includes one or more of a rough road condition and a higher than threshold road gradient, and wherein the vehicle operating condition includes a higher than threshold rate of vehicle acceleration/deceleration and a higher than threshold vehicle speed, the method further comprising, upon detection of the active exhaust valve being intermittently degraded, identifying a route segment with the road condition or the vehicle operating condition based on inputs from one or more of an on-board navigation system, an external server (not shown), and one or more on-board sensors, the one or more on-board sensors including a crankshaft acceleration sensor, a wheel speed sensor (not shown), a steering sensor (not shown), and a yaw sensor (not shown). In any or all of the preceding examples, the method further comprising, additionally or optionally, operating the active exhaust valve for a second time in the healing mode during the identified route segment. In any or all of the preceding examples, the method further comprising, additionally or optionally, upon detection of the intermittent degradation of the active exhaust valve during monitoring of the valve after operating the active exhaust valve for the second time in the healing mode, operating the active exhaust valve for a third time in the healing mode after a threshold duration has elapsed or a threshold distance has been travelled since the immediately previous operation the active exhaust valve in the healing mode. In any or all of the preceding examples, the method further comprising, additionally or optionally, upon detection of the active exhaust valve being not degraded during monitoring of the valve after operating the active exhaust valve for the third time in the healing mode, reactivating operation of the engine sound control system. In any or all of the preceding examples, the method further comprising, additionally or optionally, upon detection of the degradation of the active exhaust valve during monitoring of the valve after operating the active exhaust valve for the third time in the healing mode, indicating the active exhaust valve to be permanently degraded, deactivating actuation of the active exhaust valve, and setting the diagnostic code.

Another example engine method, comprises: during a first condition, identifying a travel segment with increased engine vibrations or higher than threshold ambient wind speed, and during the identified travel segment, adjusting an opening of an active exhaust valve coupled to an exhaust passage downstream of a muffler to dislodge a contaminant in a body of the active exhaust valve; and during a second condition, setting a diagnostic code indicating degradation of the active exhaust valve and disabling operation of the active exhaust valve. In any preceding example, additionally or optionally, the first condition includes the active exhaust valve being intermittently stuck at a position during actuation of the valve from a closed position to an open position, and wherein the second condition includes the active exhaust valve being continually stuck at the position during the actuation of the valve from the closed position to the open position. In any or all of the preceding examples, additionally or optionally, adjusting the opening includes duty cycling the active exhaust valve repeatedly from the closed position to the open position.

Yet another example engine system, comprises: in response to an active exhaust valve coupled to an exhaust passage downstream of a muffler being stuck, identify a road segment with one or more of rough road condition, a higher than threshold gradient, and a higher than threshold curvature via input from one or more of an on-board navigational system, an external server (not shown), a crankshaft acceleration sensor, a wheel speed sensor, a steering sensor (not shown), and a yaw sensor (not shown), identify an vehicle operating condition with a higher than threshold vehicle acceleration/deceleration rate and/or a higher than threshold vehicle speed via input from one or more of the on-board navigational system or the external server, the crankshaft acceleration sensor, the wheel speed sensor, and the steering sensor, and actuate the active exhaust valve from a closed position to an open position a plurality of times during one of the identified road segment and the vehicle operating condition to remove a contaminant stuck in a body of the active exhaust valve. In any preceding example, additionally or optionally, the on-board controller includes further instructions to: after a threshold duration of time has elapsed or a threshold distance has been travelled since the immediately previous actuation of the active exhaust valve, repeat the actuation of the active exhaust valve from the closed position to the open position a plurality of times in response to the active exhaust valve being stuck after the immediately previous actuation. In any or all of the preceding examples, the method further comprising, additionally or optionally, an engine sound control system for adjusting audible engine sound, the engine sound control system including the active exhaust valve, wherein an opening of the active exhaust valve is adjusted based on an input of an operator to the engine sound control system, the input indicating a desired level of audible engine sound.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
   in response to detection of an intermittent degradation of an active exhaust valve as determined via a controller receiving input from an exhaust valve position sensor, adjusting actuation of the active exhaust valve based on a vehicle operating condition and a road condition received from a navigation system via the controller, wherein the active exhaust valve is coupled to an exhaust passage downstream of a muffler and an opening of the active exhaust valve is adjusted responsive to inputs to the controller for adjusting audible exhaust sound.

2. The method of claim 1, wherein adjusting actuation of the valve includes sending duty cycling commands to an actuator coupled to the active exhaust valve via the controller responsive to the intermittent degradation.

3. The method of claim 2, wherein the duty cycling commands are sent to the actuator via the controller to gradually change an opening of the valve from a 10% opening to an 80% opening.

4. The method of claim 2, further comprising, upon detection of a degradation of the active exhaust valve during monitoring of the active exhaust valve via the controller, operating the active exhaust valve for a first time in a healing mode via the controller, wherein the healing mode includes sending the duty cycling commands to the actuator one or more times to dislodge contaminant from a body of the active exhaust valve.

5. The method of claim 4, wherein the monitoring of the active exhaust valve includes
   commanding the active exhaust valve to move from a first position to a second position via the controller,
   monitoring a position of the active exhaust valve during a movement of the active exhaust valve via the exhaust valve position sensor, and
   detecting the degradation of the active exhaust valve via the exhaust valve position sensor in response to the active exhaust valve being stuck at a third position, the third position being between the first position and the second position.

6. The method of claim 4, further comprising, upon detection of the degradation of the active exhaust valve via the controller after the first operation in the healing mode, setting a timer via the controller, periodically monitoring the valve over a threshold duration via the controller, plotting a timer signal of the detected degradation via the controller.

7. The method of claim 6, further comprising, in response to the slope being one as determined via the controller, indicating the active exhaust valve to be permanently degraded, deactivating actuation of the active exhaust valve, and setting a diagnostic code via the controller.

8. The method of claim 7, wherein the road condition includes one or more of a rough road condition and a higher than threshold road gradient, and wherein the vehicle operating condition includes a higher than threshold rate of vehicle acceleration/deceleration and a higher than threshold vehicle speed, the method further comprising, upon detection of the active exhaust valve being intermittently degraded, identifying a route segment with the road condition or the vehicle operating condition based on inputs from one or more of an on-board navigation system and one or more on-board sensors, the one or more on-board sensors including a crankshaft acceleration sensor.

9. The method of claim 8, further comprising, operating the active exhaust valve for a second time in the healing mode during the identified route segment via the controller.

10. The method of claim 9, further comprising, upon detection of the intermittent degradation of the active exhaust valve during monitoring of the valve after operating the active exhaust valve for the second time in the healing mode via the controller, operating the active exhaust valve for a third time in the healing mode after a threshold duration has elapsed or a threshold distance has been travelled since the immediately previous operation the active exhaust valve in the healing mode via the controller.

11. The method of claim 10, further comprising, upon detection of the active exhaust valve being not degraded during monitoring of the valve after operating the active exhaust valve for the third time in the healing mode via the controller, reactivating operation of the active exhaust valve via the controller.

12. The method of claim 10, further comprising, upon detection of the degradation of the active exhaust valve during monitoring of the valve after operating the active exhaust valve for the third time in the healing mode via the controller, indicating the active exhaust valve to be permanently degraded, deactivating actuation of the active exhaust valve, and setting the diagnostic code via the controller.

13. A method for operating an active exhaust valve of an engine, comprising:
   identifying a travel segment with increased engine vibrations or higher than threshold ambient wind speed via a controller, and during the identified travel segment, adjusting an opening of the active exhaust valve, the active exhaust valve coupled to an exhaust passage downstream of a muffler to dislodge a contaminant in a body of the active exhaust valve via the controller; and
   setting a diagnostic code indicating degradation of the active exhaust valve and disabling operation of the active exhaust valve via the controller.

14. The method of claim 13, wherein the active exhaust valve is intermittently stuck at a position during actuation of the active exhaust valve from a closed position to an open position before identifying the travel segment, and wherein the diagnostic code is set when the active exhaust valve is continually stuck at the position during the actuation of the valve from the closed position to the open position.

15. The method of claim 14, wherein adjusting the opening includes duty cycling the active exhaust valve repeatedly from the closed position to the open position via the controller.

16. An engine system, comprising:
a controller including computer-readable executable instructions stored on non-transitory memory that cause the controller to:
in response to an active exhaust valve coupled to an exhaust passage downstream of a muffler being stuck,
identify a road segment with one or more of a rough road condition and a higher than threshold gradient via input from a navigation system;
identify a vehicle operating condition with a higher than threshold vehicle acceleration/deceleration rate and/or a higher than threshold vehicle speed via input from an on-board navigational system; and
actuate the active exhaust valve from a closed position to an open position a plurality of times during one of the identified road segment and the vehicle operating condition to remove a contaminant stuck in a body of the active exhaust valve.

17. The system of claim 16, wherein the controller includes further instructions that cause the controller to: after a threshold duration of time has elapsed or a threshold distance has been travelled since the immediately previous actuation of the active exhaust valve, repeat the actuation of the active exhaust valve from the closed position to the open position a plurality of times in response to the active exhaust valve being stuck after the immediately previous actuation.

18. The system of claim 16, further comprising additional executable instructions that cause the controller to open the active exhaust valve based on an input of an operator to the controller, the input indicating a desired level of audible engine sound.

* * * * *